Sept. 7, 1937.  A. V. SAHAROFF  2,092,087

PISTON

Filed Aug. 18, 1934  3 Sheets-Sheet 1

A. V. Saharoff
INVENTOR

BY
ATTORNEY

Sept. 7, 1937.  A. V. SAHAROFF  2,092,087
PISTON
Filed Aug. 18, 1934  3 Sheets-Sheet 2
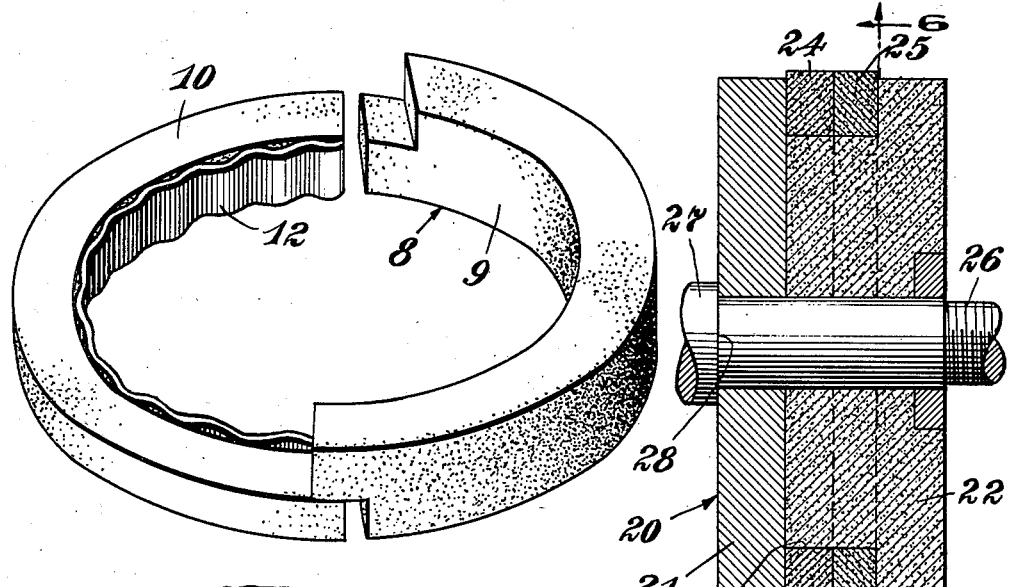
Fig. 4.
Fig. 5.
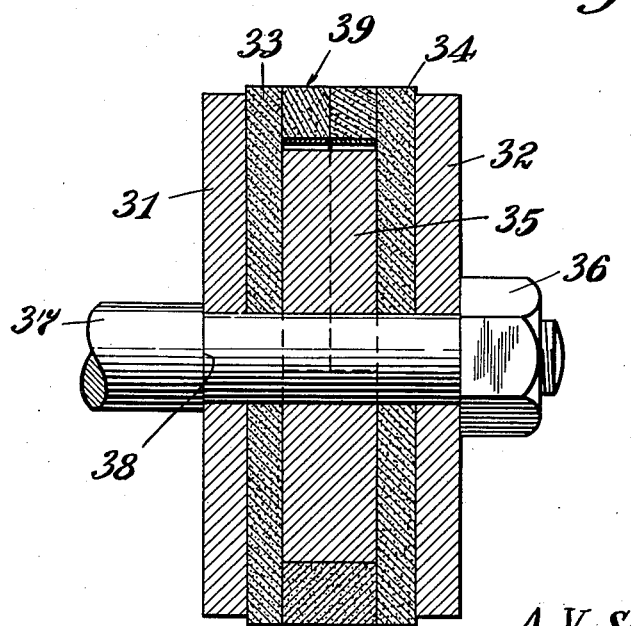
Fig. 7.
A. V. Saharoff
INVENTOR
BY
ATTORNEY Sept. 7, 1937.   A. V. SAHAROFF   2,092,087
PISTON
Filed Aug. 18, 1934   3 Sheets-Sheet 3
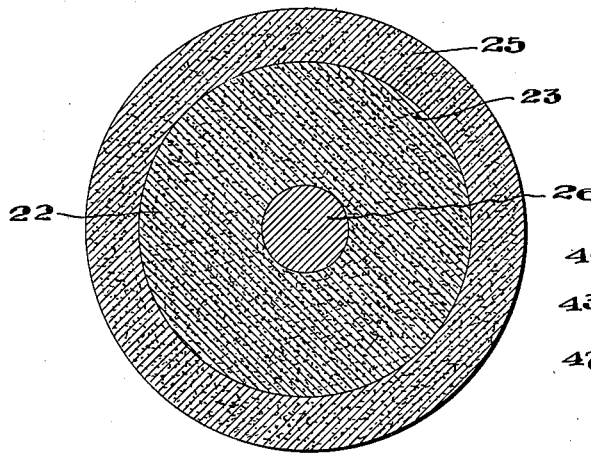
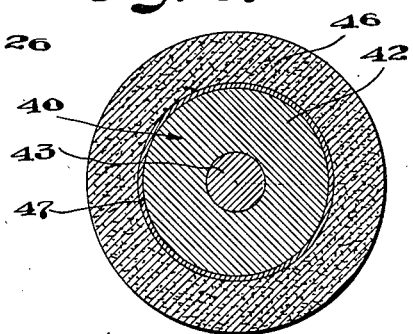
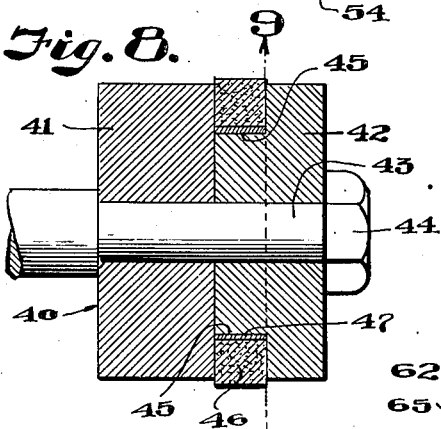
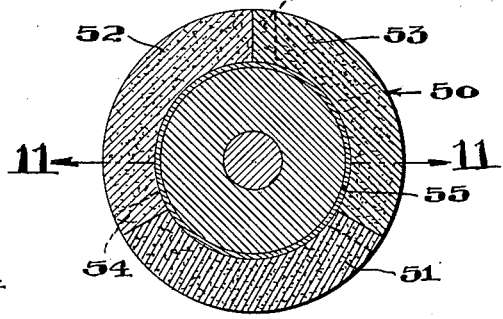
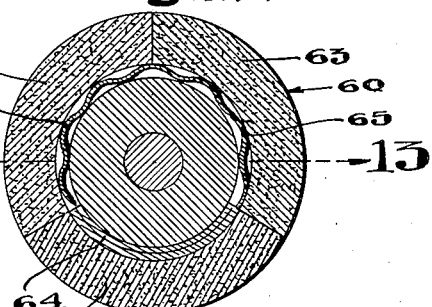
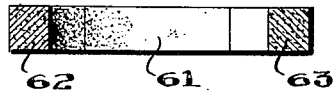
A. V. SAHAROFF.
INVENTOR
BY
ATTORNEY Patented Sept. 7, 1937

2,092,087

UNITED STATES PATENT OFFICE 2,092,087

PISTON

Alexander V. Saharoff, Buffalo, N. Y., assignor to Worthington Pump and Machinery Corporation, New York, N. Y., a corporation of Virginia Application August 18, 1934, Serial No. 740,370

6 Claims. (Cl. 309—23)

This invention relates to pistons for air or gas compressors, engines or analogous mechanisms of the reciprocating type.

An object of the present invention is to provide a built-up piston for such mechanisms, which embodies in its construction sections and/or rings of hard compact graphitized carbon, which will serve as a lubricant, eliminating the need of employment of other lubricating mediums, and which will effect close physical contact with the walls of the cylinder of the machine at all times regardless of the temperature of the piston and cylinder.

With these and other objects in view, as may appear from the accompanying specification, the invention consists of various features of construction and combination of parts, which will be first described in connection with the accompanying drawings, showing pistons of the preferred form, and the features forming the invention will be specifically pointed out in the claims.

In the drawings:

Figure 4 is a prospective view of two sections of the improved piston ring.

Fig. 5 is a longitudinal sectional view through a modified form of the piston.

Fig. 6 is a cross sectional view taken on the line 6—6 of Fig. 5.

Fig. 7 is a longitudinal sectional view through a second modified form of the piston.

Fig. 8 is a longitudinal sectional view through a further modified form of the piston ring.

Fig. 9 is a cross sectional view taken on the line 9—9 of Fig. 8.

Fig. 10 is a cross sectional view through a piston of the type illustrated in Fig. 8 showing a further modified form of the piston ring.

Fig. 11 is a detailed sectional view of the piston ring taken on the line 11—11 of Fig. 10.

Fig. 12 is a cross sectional view through a piston of the type illustrated in Fig. 8 showing another modified form of the piston ring construction.

Fig. 13 is a detailed sectional view through the piston ring taken on the line 13—13 of Fig. 12.

Figure 1:
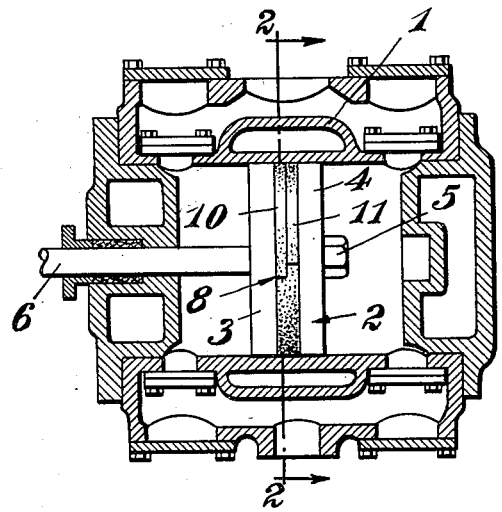
Fig. 1 is a longitudinal sectional view through a compressor cylinder showing the piston constructed in accordance with this invention.
Figure 2:
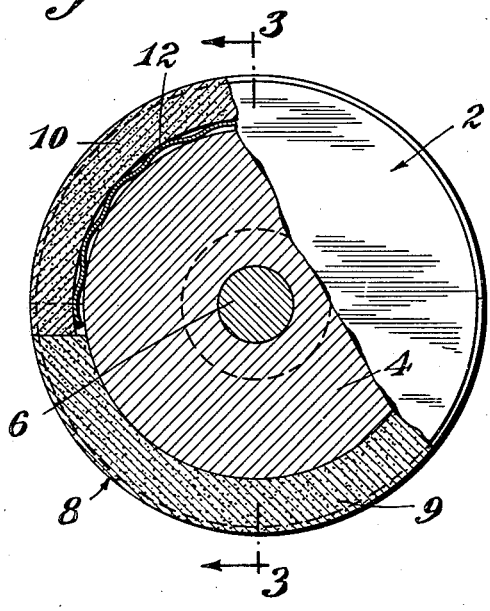
Fig. 2 is a view partly in section and partly in end elevation of the piston, the sectional part being taken on the line 2—2 of Fig. 1.

Referring more particularly to the drawings, 1 indicates a cylinder of a compressor, although it is to be understood that the improved piston construction forming the present invention may be used in connection with any type of compressor, engine or other reciprocating mechanism, without departing from the present invention.

The cylinder 1 has a piston 2 mounted therein for reciprocatory movement. The piston 2 is of the built-up type, being formed of sections 3 and 4 which are clamped and held together by a suitable nut 5 threaded on the piston rod 6. The section 4 is provided with annular cut-out portions 7 which receive therein the piston ring structure 8.

The piston ring structure 8 comprises the lower carrier section 9 and the upper sections 10 and 11. All three of the sections 9, 10 and 11 of the piston ring are constructed of hard graphitized carbon and, as clearly shown in Figs. 1 and 3 of the drawings, the carrier section 9 is equal in thickness or width to the combined widths of the sections 10 and 11. These sections of the ring encompass or encircle substantially equal portions of the perimeter of the inner wall of the cut-out portion 7. The sections 10 and 11 are urged outwardly into engagement with the wall of the cylinder 1 by sinuous spring members 12 which engage between the inner edges of the sections 10 and 11 and the inner wall of the cut-out portion 7. If it is so desired shims, as shown at 9', may be inserted between the carrier section 9 and the facing surface of groove or cut-out portion 7 of the piston.

Figure 3:
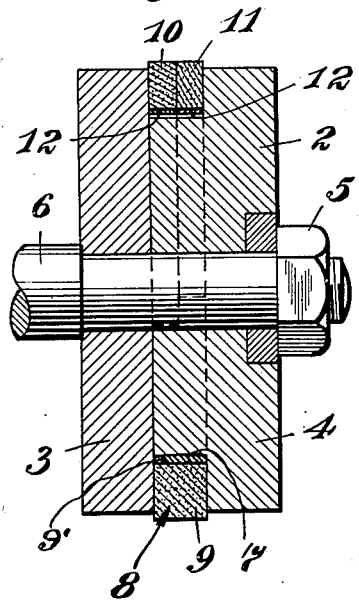
Fig. 3 is a longitudinal section through the piston taken on the line 3—3 of Fig. 2.

As clearly shown in Fig. 3 of the drawings, the ring sections 9, 10 and 11 are clamped in position in the piston structure by the connecting and clamping together of the sections 3 and 4 of the piston.

In Fig. 5 of the drawings, a modified form of the invention is shown in which the piston 20 is, of the built-up structure, being composed of a metallic section 21 and a carbon section 22; that is, the section 22 of the piston is constructed of hard compact graphitized carbon. The section 22 is provided with an annular cut-out portion 23, which co-operating with the section 21 provides an annular groove in the piston for receiving the piston rings 24 and 25. The rings 24 and 25 may be solid or continuous rings and they, like the section 22, are preferably made of hard compact graphitized carbon. The rings 24 and 25 are held in position by the connecting of the sections 21 and 22 of the piston through the medium of a nut (not shown) threaded upon the threaded end 26 of the piston rod 27 of the shoulder 28 formed on the piston rod.

Fig. 7 of the drawings shows a still further form of built-up piston embodying the self-lubricating properties which are embodied in the pistons 2 and 20. This form shown in Fig. 7 of the drawings comprises end plates 31 and 32 the inner surfaces of which engage against discs 33 and 34. The discs 33 and 34 are formed of hard compact graphitized carbon and a spaced section 35 is placed between them. The end discs 31 and 32, the carbon discs 33 and 34 and the spacing member 35 are all securely clamped together in piston-forming association in any suitable manner such as by the nut 36 threaded on the piston rod 37 and co-operating with the shoulder 38.

A piston ring construction indicated at 39 is placed between the carbon discs 33 and 34 and about the circumference of the spacing disc 35. The piston ring construction 39 may be of the type of piston ring structure illustrated in Figs. 1 to 4 inclusive or it may be the solid ring type as desired, since solid rings may be readily positioned and clamped therein through the built-up construction of the piston.

In Fig. 8 of the drawings the piston 40 is made up of the sections 41 and 42 which are connected together in any suitable manner such as by means of the extension 43 of the piston rod and the nut 44. The assembled piston 40 is provided with an annular groove 45 which receives therein the piston ring 46. The ring 46 is made of hard graphitized carbon and may be made of a single piece as shown in Fig. 9 of the drawings or may be made in a plurality of sections as shown in Figs. 10 and 12. In Figs. 8 and 9 the graphitized carbon piston ring 46 has a shim or shims 47 therein between the inner surface of the ring and the facing surface of the annular groove 45. As the piston ring becomes worn, additional shims may be inserted for compensating for the wear on the piston ring and to urge the piston ring outwardly for tight engagement with the cylinder. If it is so desired, shims may be placed between the inner surfaces of the rings 24 and 25 and the facing surfaces of their receiving grooves or between the surfaces of the carrier sections of any of the other constructions of ring illustrated in the drawings and hereinabove described.

In Fig. 10 of the drawings, the piston ring 50 is shown as composed of a carrier section 51 and a plurality of piston ring section 52 and 53. The sections 51, 52 and 53 have overlapping ends as shown at 54. In Fig. 10 shims 55 are shown positioned between the inner sides of the sections and the facing surfaces of the ring-receiving grooves. While the ring 50 is shown as being made of three sections, it is to be understood that it is to be made in any desired number of sections without departing from the spirit of the present invention.

In Figs. 12 and 13 the piston ring 60 is shown made up of a plurality of sections, namely three, which engage in endwise engagement one with each other and form respectively the carrier ring 61 and the two piston rings 62 and 63. The carrier section 61 has a shim 64 between its inner surface and the facing surface of the ring-receiving groove while the sections 62 and 63 have springs 65 between their inner sides and the facing surfaces of the ring-receiving groove in the piston. The spring 65 may be the same as the spring 12 or any other preferred type of spring which will properly urge the sections 62 and 63 in proper jointing engagement with a cylinder.

From the foregoing description taken in connection with the accompanying drawings, it will be noted that in all of the various forms illustrated in the drawings and hereinabove described, the piston structure is of the built-up type in contradistinction to the non-built-up type of piston shown in my companion application Serial No. 740,369 filed August 18, 1934.

It will be understood that this invention is not to be limited to the specific construction or arrangement of parts shown but that they may be widely modified within the invention defined by the claims.

What is claimed is:

1. In combination, a reciprocating piston composed of metallic end discs, discs of solid graphitized carbon against the inner sides of said end discs, and a central metal spacing section between said carbon discs.

2. In combination, a reciprocating piston composed of metallic end discs, discs of solid graphitized carbon against the inner sides of said end discs, a central metal spacing section between said carbon discs, said central metal spacing disc being of smaller diameter than the end and carbon discs to form an annular ring-receiving groove, and a piston ring of solid graphitized carbon in said groove.

3. In combination, a reciprocating piston composed of metallic end discs, discs of solid graphitized carbon against the inner sides of said end discs, a central metal spacing section between said carbon discs, said central metal spacing disc being of smaller diameter than the end and carbon discs to form an annular ring-receiving groove, and a piston ring of solid graphitized carbon in said groove, said piston ring composed of a carrier section and a ring section, and yieldable means between the inner edge of the ring section only and said central spacing disc.

4. In combination, a reciprocating piston composed of metallic end discs, discs of solid graphitized carbon against the inner sides of said end discs, a central metal spacing section between said carbon discs, said central metal spacing disc being of smaller diameter than the end and carbon discs to form an annular ring-receiving groove, and a piston ring of solid graphitized carbon in said groove, said piston ring comprising a wide carrier section and a plurality of narrow ring sections, said carrier section being equal in width to the combined widths of the ring sections.

5. In combination, a reciprocating piston composed of metallic end discs, discs of solid graphitized carbon against the inner sides of said end discs, a central metal spacing section between said carbon discs, said central metal spacing disc being of smaller diameter than the end and carbon discs to form an annular ring-receiving groove, a piston ring of solid graphitized carbon in said groove, said piston ring comprising a carrier section extending about a portion of the perimeter of the piston in said groove and ring sections extending about the remaining portion of the perimeter of the piston in said groove.

6. In combination, a reciprocating piston composed of a plurality of sections one of which sections is provided with a diametrically reduced portion to provide an annular piston ring-receiving groove, a piston ring of solid graphitized carbon in said groove, said piston ring comprising a carrier section extending about a portion of the perimeter of the piston in said groove, and a plurality of ring sections extending about the remaining portion of the perimeter of the piston in said groove.

ALEXANDER V. SAHAROFF.